US012528528B2

(12) United States Patent
Lv et al.

(10) Patent No.: US 12,528,528 B2
(45) Date of Patent: Jan. 20, 2026

(54) TRACKSIDE DEVICE, TRACK STAR CHAIN SYSTEM AND TRAIN OPERATION CONTROL SYSTEM

(71) Applicant: Traffic Control Technology Co., Ltd, Beijing (CN)

(72) Inventors: Lv Lv, Beijing (CN); Feng Bao, Beijing (CN); Chunyu Zhang, Beijing (CN); Yilong Wen, Beijing (CN)

(73) Assignee: Traffic Control Technology Co., Ltd, Beijing (CN)

( * ) Notice: Subject to any disclaimer, the term of this patent is extended or adjusted under 35 U.S.C. 154(b) by 482 days.

(21) Appl. No.: 17/565,446

(22) Filed: Dec. 29, 2021

(65) Prior Publication Data
US 2022/0306170 A1    Sep. 29, 2022

(30) Foreign Application Priority Data

Mar. 26, 2021  (CN) .......................... 202110322923.9

(51) Int. Cl.
*B61L 27/70* (2022.01)
*B61L 25/02* (2006.01)
*B61L 27/16* (2022.01)

(52) U.S. Cl.
CPC ............ *B61L 27/70* (2022.01); *B61L 25/025* (2013.01); *B61L 27/16* (2022.01); *B61L 2201/00* (2013.01); *B61L 2205/04* (2013.01)

(58) Field of Classification Search
CPC .... B61L 23/041; B61L 23/00; B61L 2205/04; B61L 2201/00; B61L 27/04; B61L 25/025; B61L 27/16; B61L 27/70

(Continued)

(56) References Cited

U.S. PATENT DOCUMENTS

| 7,164,368 B1 * | 1/2007 | Ireland | ..................... G01D 7/12 |
| | | | 341/20 |
| 2014/0339374 A1 * | 11/2014 | Mian | ....................... B61L 29/30 |
| | | | 246/473.1 |

(Continued)

FOREIGN PATENT DOCUMENTS

| CA | 2776192 A1 * | 11/2012 | ............ B61L 23/041 |
| CN | 201170927 Y | 12/2008 | |

(Continued)

OTHER PUBLICATIONS

Machine translation of WO-2011154347-A2 (Year: 2011).*

(Continued)

*Primary Examiner* — Kenneth M Dunne
(74) *Attorney, Agent, or Firm* — East IP P.C.

(57) ABSTRACT

Embodiments of the application relate to a technical field of traffic trackside intelligent devices. A trackside device includes: a collection module configured to collect detection information at a side of a track; a processing module configured to process the detection information to obtain a processing result; a trackside resource control module configured to drive and control a trackside resource when a trackside resource request is received from a target train and the trackside resource is in a released state, wherein the trackside resource control module is further configured to monitor a state of the trackside resource; and a communication module configured to communicatively connect with a ground center and the target train.

20 Claims, 3 Drawing Sheets

(58) Field of Classification Search
USPC .......................................................... 701/120
See application file for complete search history.

(56) References Cited

U.S. PATENT DOCUMENTS

| | | | |
|---|---|---|---|
| 2016/0046308 A1* | 2/2016 | Chung .................... | B61L 27/20 |
| | | | 701/20 |
| 2019/0054942 A1* | 2/2019 | Carlson ................... | B61L 27/70 |
| 2019/0291758 A1* | 9/2019 | Tsuchida ................. | B61L 27/70 |
| 2021/0370993 A1* | 12/2021 | Qian ........................ | G06T 7/75 |
| 2023/0278604 A1* | 9/2023 | Braband ............... | G01S 13/886 |
| | | | 342/27 |

FOREIGN PATENT DOCUMENTS

| | | | | | |
|---|---|---|---|---|---|
| CN | 104590319 | A | | 5/2015 | |
| CN | 106080674 | A | | 11/2016 | |
| CN | 106864481 | A | | 6/2017 | |
| CN | 106926871 | A | | 7/2017 | |
| CN | 107976697 | A | | 5/2018 | |
| CN | 109515476 | A | | 3/2019 | |
| CN | 111381237 | A | | 7/2020 | |
| CN | 211468460 | U | | 9/2020 | |
| CN | 112009524 | A | * | 12/2020 | ............ B61L 23/007 |
| CN | 112441087 | A | | 3/2021 | |
| DE | 102004032338 | A1 | * | 3/2006 | ............ B61L 23/041 |
| DE | 102016216320 | A1 | * | 3/2018 | |
| EP | 1215100 | A1 | * | 6/2002 | ............ B60M 1/04 |
| KR | 100998339 | B1 | * | 12/2010 | |
| WO | WO-2011154347 | A2 | * | 12/2011 | ............ B61L 23/041 |
| WO | 2018208153 | A1 | | 11/2018 | |
| WO | WO-2021053866 | A1 | * | 3/2021 | ............ B60L 3/0007 |

OTHER PUBLICATIONS

Machine translation of KR-100998339-B1 (Year: 2010).*
Machine translation of EP-1215100-A1 (Year: 2002).*
Machine translation of WO-2021053866-A1 (Year: 2021).*
Machine translation of DE-102004032338-A1 (Year: 2006).*
Machine translation of DE-102016216320-A1 (Year: 2018).*
Machine translation of CN 112009524 A specification with para numbers (Year: 2020).*
The First Office Action for Chinese Application No. 202110322923.9, dated May 8, 2021, 9 pages.
The Second Office Action for Chinese Application No. 202110322923.9, dated May 28, 2021, 6 pages.
The extended European search report for European Application No. 21218262.0, dated Nov. 21, 2022, 13 pages.
Jiang Liu et al., Train positioning system based on GPS and inertial measurement unit, vol. 31, No. 1, Jan. 2010, 8 pages.
The Partial European search report for European Application No. 21218262.0, dated Jun. 21, 2022, 14 pages.
The Grant Notification for Chinese Application No. 202110322923.9, dated Jun. 10, 2021, 6 pages.

* cited by examiner

TRACKSIDE DEVICE, TRACK STAR CHAIN SYSTEM AND TRAIN OPERATION CONTROL SYSTEM

CROSS REFERENCE TO RELATED APPLICATIONS

This application claims priority to Chinese Patent Application No. 202110322923.9, filed on Mar. 26, 2021, which is hereby incorporated by reference in its entirety.

TECHNICAL FIELD

The application relates to a technical field of traffic trackside intelligent devices, in particular to a trackside device, a track star chain system and a train operation control system.

BACKGROUND

With development of automation and communication technologies, a vehicle-vehicle communication based train operation control system (VBTC system) has gradually become a development trend of rail transit train control systems.

A vehicle-vehicle communication system takes an on-board intelligent device as a core to strengthen communication between trains and simplify vehicle-ground communication, and thus reduce a number of devices in the system and a coupling degree of the system. In related arts, vehicle-vehicle communication technology still has certain limitations. For example, a sensing distance of the on-board intelligent device of a train is limited, and it is easily restricted by environment factors such as curves and tunnels and so on, resulting in that a limited sensing range of the on-board intelligent device.

SUMMARY

Embodiments of the application provide a trackside device, a track star chain system and a train operation control system, which are used to overcome a problem of a limited sensing range of existing on-board intelligent devices.

A first aspect of the application provides a trackside device, comprising: a collection module configured to collect detection information at a side of a track; a processing module configured to process the detection information to obtain a processing result, wherein the processing result comprises at least one of the following: a track section having been cleared, the track section having been occupied, an obstacle detection result and an obstacle recognition result; a trackside resource control module configured to drive and control a trackside resource when a trackside resource request is received from a target train and the trackside resource is in a released state, wherein the trackside resource control module is further configured to monitor a state of the trackside resource; and a communication module configured to communicatively connect with a ground center and the target train and send the processing result to the ground center and/or the target train or send the state of the trackside resource to the ground center and/or the target train.

A second aspect of the application provides a track star chain system, comprising a plurality of trackside devices of any one of the foregoing items, wherein communication connections between the plurality of trackside devices are established through ad hoc networking technology and/or multi-hop networking technology.

A third aspect of the application provides a train operation control system, comprising: a target train, a ground center and at least one trackside device of any one of the foregoing items, wherein the trackside device is communicatively connected with the ground center and the target train.

As the trackside device can collect the detection information at the side of the track, process the detection information to obtain the processing results, drive and control the trackside resource and monitor the state of the trackside resource, and can send the processing results, the state of the trackside resource and so on to the ground center and/or the target train, a sight distance of the target train can be extended, and thus the problem of the limited sensing range of the on-board intelligent device can be overcome.

BRIEF DESCRIPTION OF THE DRAWINGS

Drawings described herein are used to provide further understanding of the application and form a part of the application. Schematic embodiments of the application and their descriptions are used to explain the application and do not constitute an improper limitation of the application. In the drawings.

DETAILED DESCRIPTION

In order to make technical solutions and advantages of embodiments of the application more clear, exemplary embodiments of the application are described in further detail below in combination with accompanying drawings. Obviously, the described embodiments are only part of the embodiments of the application, not an exhaustive list of all embodiments. It should be noted that the embodiments of the application and features in the embodiments may be combined with each other without conflicts.

In related arts, vehicle-vehicle communication technology still has certain limitations. For example, a sensing distance of an on-board intelligent device of a train is limited, and it is easily restricted by environment factors such as curves and tunnels, resulting in that sensing accuracy of the on-board intelligent device cannot be guaranteed.

In addition, the vehicle-vehicle communication technology still needs cooperation among traditional trackside devices such as a track circuit, an axle counter, a transponder, an annunciator and so on. However, the traditional trackside devices have a wide variety and complex installation and maintenance, which leads to a high cost of a rail transit system.

In order to overcome at least one of the above problems, the embodiments of the application provide a trackside device, a track star chain system and a train operation control system. The trackside device can collect detection information at a side of a track, process the detection information to obtain a processing result, drive and control a trackside resource and monitor a state of the trackside resource, and send the processing result and the state of trackside resource to a ground center and/or a target train, so that the trackside device has functions of integrated communication, intelligent perception, train auxiliary operation and signal control and so on, which is conducive to extending a sight distance of the target train, thus overcoming a problem of the limited sensing range of the on-board intelligent device, and also conducive to realizing functions of vehicle-ground communication, vehicle-track coordination, trackside resource control and so on, further simplifying devices at the side of the track and reducing installation and maintenance costs of the devices.

A structure, function and implementation process of the trackside device provided by the embodiment are illustrated below in combination with FIGS. 1 to 5.

Figure 1:
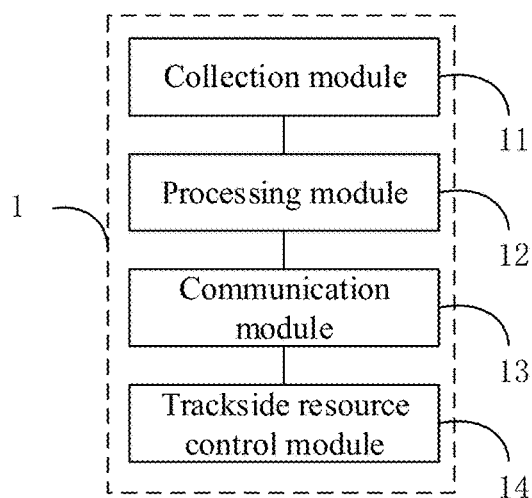
FIG. 1 is a structure diagram of a trackside device provided by an exemplary embodiment.

As shown in FIG. 1, the trackside device 1 provided by the embodiment includes a collection module 11, a processing module 12, a trackside resource control module 14 and a communication module 13.

The collection module 11 is configured to collect detection information at a side of a track. The side of the track refers to a position next to or around the track. The collection module 11 may be configured to collect detection information such as point cloud data, image data and so on at the side of the track. The collection module 11 sends the collected detection information to the processing module 12.

The processing module 12 is configured to process the detection information to obtain a processing result, wherein the processing result includes at least one of the following: a track section having been cleared, the track section having been occupied, an obstacle detection result and an obstacle recognition result. Based on the detection information, the processing module 12 may determine a state of the track section (for example, the track section having been cleared or occupied), determine whether there is an obstacle to obtain the obstacle detection result (for example, there is an obstacle or no obstacle), and when there is an obstacle, identify a type, a size, a shape and so on of the obstacle. In a specific implementation, information contained in the processing result is not limited to thereby, and this embodiment is only an example here.

Optionally, the collection module 11 includes at least one radar 112 for detecting point cloud data of a target object, and the processing module 12 is configured to determine at least one of shape information, size information and distance information of the target object according to the point cloud data. The shape information indicates a shape of the target object; the size information indicates a size or dimension of the target object; and the distance information indicates a distance between the target object and the trackside device. The point cloud data may include a set of measured point data of an appearance surface of the target object.

Figure 2:
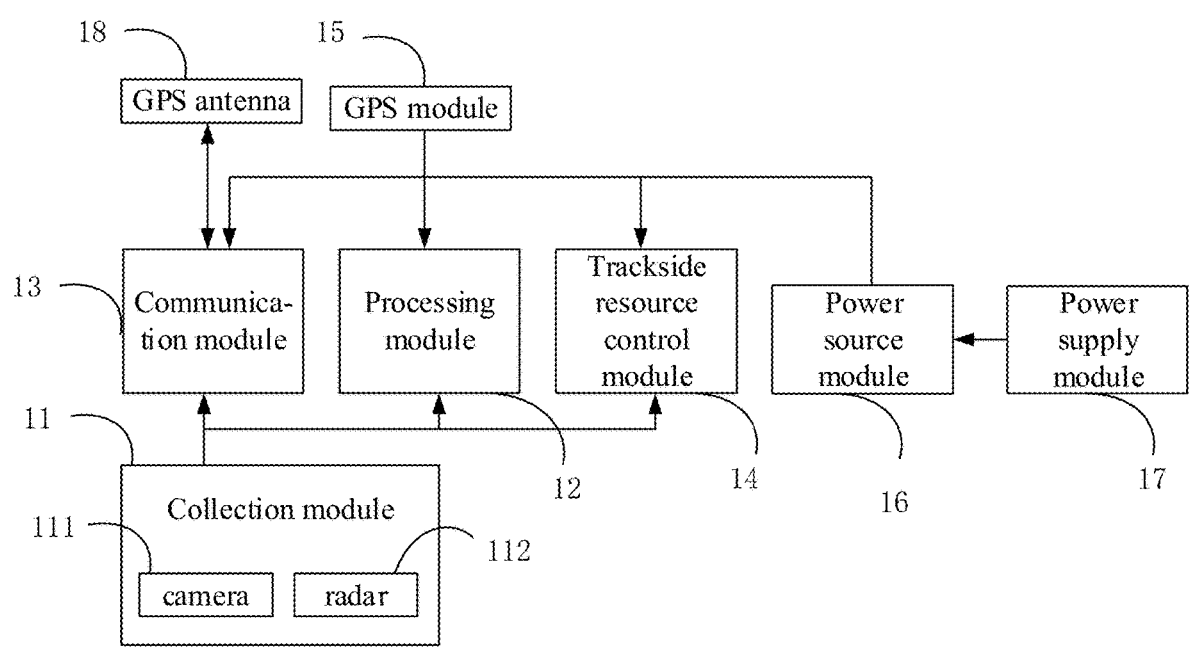
FIG. 2 is a structure diagram of a trackside device provided by another exemplary embodiment.

As shown in FIG. 2, the collection module 11 further includes at least one camera 111 for detecting image data of the target object. The processing module 12 is configured to determine existence information of the target object according to the image data. Specifically, the processing module 12 is configured to according to the image data, determine whether there is a target object, and when there is a target object, determining a type of the target object.

In this example, the number of cameras 111 and the number of radars 112 are not specifically limited. There may be one or more cameras 111. When there are a plurality of cameras 111, types of the plurality of cameras 111 may be different, or at least part of the plurality of cameras 111 may cooperate with each other, or at least part of the plurality of cameras 111 may be used as backup cameras. There may be one or more radars 112. When there are a plurality of radars 112, types of the plurality of radars 112 may be different, or at least part of the plurality of radars 112 may cooperate with each other, or at least part of the plurality of radars 112 may be used as backup radars. Of course, implementation of the collection module 11 is not limited to thereby. The embodiment is only an example here. The collection module 11 may further include other sensors, such as an infrared sensor.

The processing module 12 is configured to process and analyze data collected by the radar 112 and the camera 111. The processing module 12 is configured to, according to one or more of the existence information, the shape information, the size information and the distance information of the target object, perform processing such as track section clearance and occupation detection, obstacle detection and recognition and so on to obtain the processing result. For example, the processing module 12 analyzes the shape, the size, the distance and other information of the target object according to the point cloud data collected by the radar 112, and performs auxiliary recognition of the target object through vision technology by using the image data collected by the camera 111, so as to determine that the target object is an operation and maintenance personnel, an obstacle or a train and the distance between the target object and the trackside device.

Specifically, when it is determined that the target object is the operation and maintenance personnel, the trackside device 1 may be triggered to send corresponding protection information to a corresponding train in its managed section (that is, a target train 3) and/or a ground center, so as to prohibit the target train 3 from approaching and thus protect the operation and maintenance personnel or to prompt the operation and maintenance personnel to leave. When it is determined that the target object is an obstacle, if the target train 3 applies for movement authorization, it is prohibited to give a permission to the target train 3 for a location of the obstacle. For example, a front end of the movement authorization of the target train 3 is located behind the obstacle; until the obstacle is removed, the permission for the corresponding location is not given to the target train 3. When it is determined that the target object is a previous target train 3, it is determined whether the operation of the target train 3 is affected by a distance between the previous target train 3 and a current trackside device, that is, whether the previous train is located in a section applied for by the target train 3. If it is, it is determined that the section has been occupied; if it is not, it is determined that the section has been cleared. Of course, operations after determining the target object is not limited to thereby, and the embodiment is only an example here.

Figure 3:
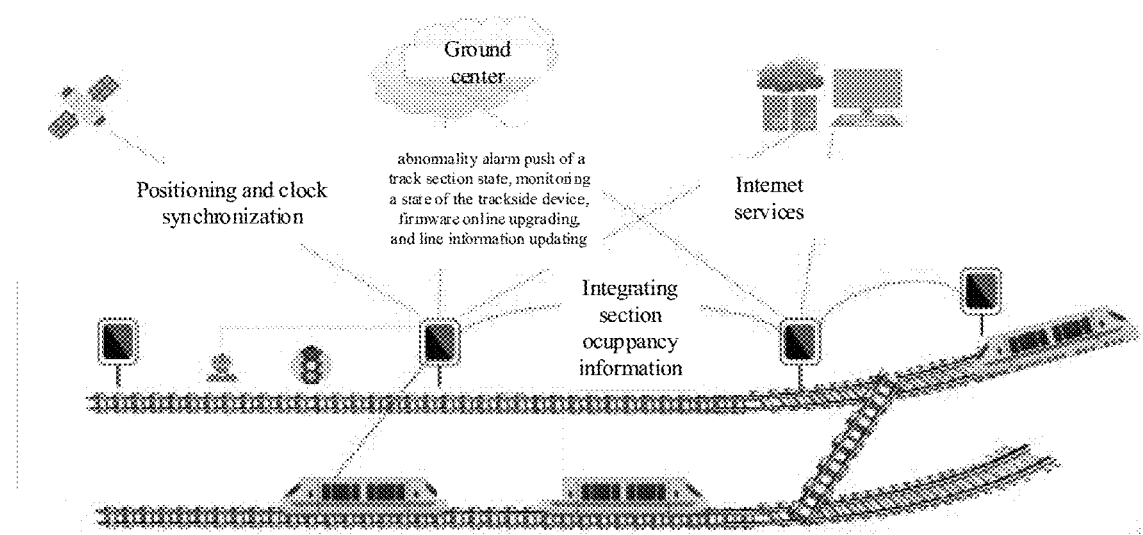
FIG. 3 is an application diagram of a track star chain system provided by an exemplary embodiment.

Furthermore, as shown in FIG. 3, the processing module 12 can also integrate section occupancy information of a plurality of trackside devices 1, so as to facilitate longer-distance section occupancy detection. For example, the trackside device 1 obtains the detection information and/or processing results of one or more other trackside devices adjacent to it based on communication connections with the other trackside devices, and the processing module of the trackside device integrates the detection information and/or the processing result of its own and the obtained detection information and/or processing results of the other trackside devices, so as to obtain longer-distance section occupancy information.

In this example, the radar 112 and the camera 111 cooperate with each other, and through the processing and analysis of the processing module 12, the trackside device 1 can realize functions of providing detailed section occupation information (occupied or cleared), movement authorization and personnel protection for the target train 3; as shown in FIG. 3, the point cloud data and/or the image data may also be uploaded to the ground center to facilitate video detection of an environment at the side of the track by the ground center.

The trackside resource control module 14 is configured to drive and control a trackside resource when the trackside resource is in a released state after receiving a trackside resource request from the target train 3 and performing authentication and occupancy detection according to the trackside resource request. The trackside resource control module 14 is further configured to monitor a state of the trackside resource. The trackside resource include a turnout, a signal lamp, a shielding door and so on. The trackside resource control module 14 is also configured to generate abnormality prompt information when determining a trackside abnormality according to the state of trackside resource, and remind relevant personnel in time.

In this example, the trackside resource control module 14 integrates functions of a traditional Object Controller (OC), and it can drive and control a turnout, an annunciator, a shielding door and so on at the side of the track, monitor the state of the trackside resource, and timely report device fault information to the ground center, which facilitates the ground center to determine a fault and timely maintain it, further simplifying devices at the side of the track.

Figure 4:
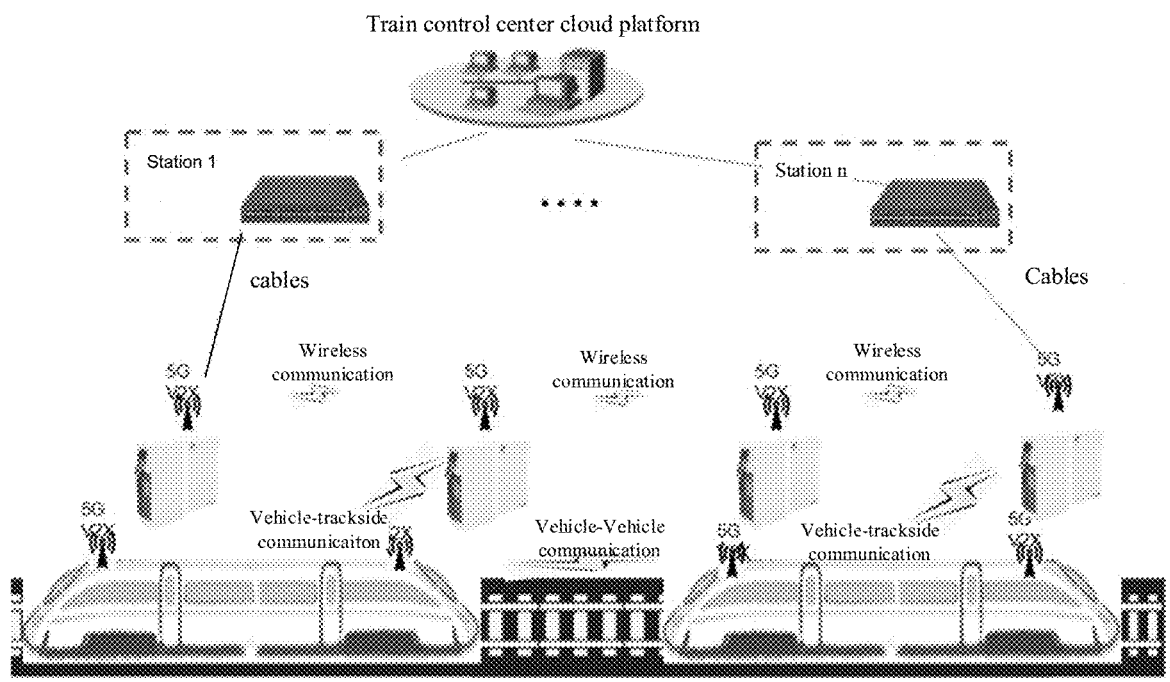
FIG. 4 is a wireless communication diagram of a track star chain system provided by an exemplary embodiment.
Figure 5:
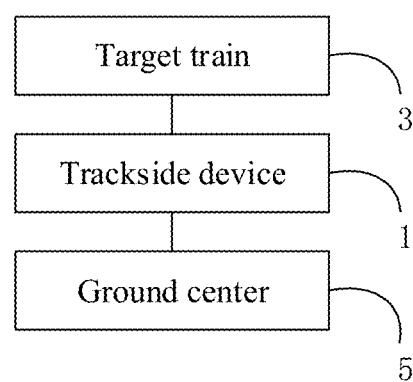
FIG. 5 is a structure diagram of a train operation control system.

As shown in FIG. 3 and FIG. 4, the communication module 13 is configured to establish communication connections with another trackside device 1, the ground center and the target train 3 in a corresponding section. Optionally, the communication module 13 may be configured to communicatively connect with another trackside device 1 through ad hoc networking technology and/or multi-hop networking technology. Of course, the communication module 13 may also be configured to connect with other terminals that need to communicate wirelessly with the trackside device 1 through the ad hoc networking technology and/or the multi-hop networking technology. As shown in FIG. 5, the communication module 13 may also be configured to establish a communication connection with the ground center 5 through cable or wireless communication; and the communication module 13 may be also configured to establish a communication connection with a corresponding target train 3 through wireless communication.

In a specific implementation, rail transit involves a plurality of trackside devices 1, between which communication connections may be established through wireless communication technology. Optionally, the plurality of trackside devices 1 are communicatively connected through the ad hoc networking technology and/or the multi-hop networking technology. At this time, the plurality of trackside devices 1 form a track star chain system. Of course, the track star chain system is not limited to the trackside device 1, but may also include the ground center and other terminals. Each trackside device in the track star chain system may also be called a star chain node (or a star chain device). Respective star chain nodes in the track star chain system are communicatively connected, and converged to the ground center 5 through star chain nodes of adjacent stations.

Respective trackside devices 1 in the track star chain system are communicatively connected through the ad hoc networking technology and/or the multi-hop networking technology. When the ad hoc network technology is used to establish a communication connection, each trackside device 1 may establish a network connection with a trackside device 1 within a surrounding communication range by itself. When the multi-hop networking technology is used to establish a communication connection, communication between the trackside devices 1 may jump from one trackside device 1 to a next trackside device 1, so as to transfer one by one until reaching a destination and thus realize communication of a whole link.

Optionally, the trackside device is communicatively connected with at least part of other trackside devices of the track star chain system in which the trackside device is located through the multi-hop networking technology. That is, the trackside device is communicatively connected with respective other trackside devices of the track star chain system in which the trackside device is located through the multi-hop networking technology, or the trackside device is communicatively connected with part of the trackside devices of the track star chain system in which the trackside device is located through the multi-hop networking technology. Thus, in case of communication failure of part of the trackside devices in the track star chain system, the multi-hop networking technology can still ensure that data is transmitted to the destination, which is conducive to ensuring reliability of data transmission in the track star chain system and making the track star chain system scalable.

In this example, respective trackside devices 1 are communicatively connected with each other by wireless communication, which is conducive to reducing layout of cables, reducing difficulty of installation and maintenance of the trackside devices 1, and greatly reducing the cost of rail transit.

In other examples, the trackside devices 1 may also be communicatively connected with other by cables, so as to reduce the cost of communication connection and ensure the stability and reliability of communication connection.

Each trackside device 1 may establish wireless communication with the target train 3 in its managed section. For example, the trackside device 1 establishes wireless communication with the target train 3 through 5G (5th generation mobile communication technology) and Vehicle to X (V2X) information interchanging technology, so as to realize vehicle-ground communication to send the processing result of the trackside device 1 to the target train 3, and provide a communication basis for the target train 3 to apply for trackside resource occupation control. For example, a plurality of trackside devices 1 are arranged along an extension direction of a track line according to a preset rule. For example, the trackside devices 1 are arranged at intervals of a preset distance, sections managed by the trackside devices 1 at different positions are different, or the track line is divided into a plurality of sections according to the arrangement of the trackside devices 1, and each trackside device 1 is communicatively connected with its own target train 3, and each trackside device 1 is communicatively connected with the ground center 5.

In this embodiment, the target train 3 refers to a train that is located in a section managed by the trackside device and can establish a communication connection with the trackside device when there is no communication failure.

Wireless communication can also be established between trains through vehicle to vehicle communication technology.

The communication module 13 is configured to send the processing result to the ground center 5 and/or the target train 3. For example, the communication module 13 is configured to send the state of the track section (for example, the track section having been cleared or occupied) to the target train 3; the communication module 13 may also be configured to send the obstacle detection result and the obstacle recognition result to the target train 3, so as to facilitate the target train 3 to take a corresponding action in time, such as braking and parking. In case of communication failure of the target train 3, the communication module 13 may send the state of the track section, the obstacle detection result and the obstacle recognition result to the ground center 5 or another device.

In other examples, the communication module 13 may also be configured to send the obstacle detection result and the obstacle recognition result to the ground center 5, which is conducive to the ground center 5 to take a corresponding action in time to reduce the impact of an obstacle on the operation of the target train 3. When there are operation and maintenance personnel for operation and maintenance operation, it is also helpful for the ground center 5 to understand on-site operation and maintenance situations.

The communication module 13 may also be configured to send the state of the trackside resource to the ground center 5 and/or the target train 3. The communication module 13 may also be configured to send the state of the trackside resource to the target train 3 to facilitate a next action of the target train 3. For example, the communication module 13 sends information that the trackside resource is in the released state (or unlocked) to the target train 3; in case of communication failure of the target train 3, the communication module 13 may send the information that the trackside resource is in the released state to the ground center 5.

The communication module 13 may also send the state of the trackside resource to the ground center 5 to facilitate the ground center 5 to determine whether the trackside resource is abnormal; alternatively, the trackside resource control module 14 determines whether the trackside resource is abnormal and generates the abnormality prompt information when determining the trackside resource is abnormal, and the communication module 13 sends the abnormality prompt information generated by the trackside resource control module 14 to the ground center 5, which is conducive to the ground center 5 to take a corresponding action in time.

In this example, through data transmission between the trackside device 1 and the ground center 5, the trackside device 1 can provide video detection, abnormality alarm push, trackside resource state monitoring and other data information for the ground center 5, which is conducive to the ground center 5 to assist safe and reliable operation of trains.

The trackside device 1 provided in the embodiments of the application can collect the detection information of the trackside device 1, process the detection information to obtain the processing result, drive and control the trackside resource and monitor the state of the trackside resource, and send the processing result and the state of the trackside resource to the ground center 5 and/or the target train 3, so that the trackside device 1 has functions of integrated communication, intelligent perception, train auxiliary operation, signal control and so on, which is conducive to realizing vehicle-ground communication, train-track coordination, trackside resource control and extending train sight distance, further simplifying the devices at the side of the track and reducing installation and maintenance costs of the devices.

In one possible implementation, the communication module 13 is also configured to connect with an Ethernet system of an adjacent station through an optical fiber link, so that the trackside device 1 can reliably provide Internet services for the track star chain system and passengers. The communication module 13 is also configured to receive a network access request from a requesting device and establish a wireless connection with the requesting device according to the network access request, wherein the requesting device may be another trackside device 1 or an intelligent device such as a user terminal, to which the Internet services can be provided. For example, the trackside device 1 adjacent to a station in the track star chain system may access Internet so that the trackside device 1 can provide the Internet services for the track star chain system. Furthermore, the track star chain system can provide the Internet services for passengers through wireless communication and improve user experience. The device of the station is communicatively connected with a train control center cloud platform.

In one possible implementation, the trackside device 1 also includes a positioning module, which is configured to position the target train 3 to obtain position information of the target train 3. The positioning module may be realized by a Global Positioning System (GPS) module or a BeiDou satellite module. In this example, positioning the target train 3 through the trackside device 1 is conducive to more accurately determining a current position of the target train 3 and ensuring exact operation of the target train 3.

For example, the position information obtained from the positioning of the target train 3 by the trackside device 1 may be used to correct position information obtained by the target train 3 through its own positioning system. For example, when a position deviation between the position information obtained by the trackside device 1 from positioning the target train 3 and the position information obtained by the target train 3 through its own positioning system does not exceed a first threshold, the position information obtained by the target train 3 itself may be used as the current position of the target train 3. When the position deviation between the position information obtained by the trackside device 1 from positioning the target train 3 and the position information obtained by the target train 3 through its own positioning system exceeds the first threshold and does not exceed a second threshold, an average value of the two pieces of positioning information is taken as the current position of the target train 3. When the position deviation between the position information obtained by the trackside device 1 from positioning the target train 3 and the position information obtained by the target train 3 through its own positioning system exceeds the second threshold, it may be determined that the positioning module of the trackside device 1 or the positioning system of the target train 3 is abnormal. The target train 3 and/or the trackside device 1 may report an abnormal state to the ground center 5. Of course, in this embodiment, the implementation method of correcting the position information obtained by the target train 3 through its own positioning system by using the position information obtained by the trackside device 1 from positioning the target train 3 is not limited to thereby. This embodiment is only an example here.

Optionally, in a specific implementation, when the current target train 3 continuously passes through multiple trackside devices 1, and position deviations between the position information obtained by the target train 3 through its own positioning system and the position information obtained by the multiple trackside devices 1 all exceed the second threshold, it is determined that the positioning system of the target train 3 is abnormal. The target train 3 and/or the trackside device 1 may report the abnormal state to the ground center 5.

When the target train 3 passes through a current trackside device 1, the position deviation between the position information obtained by the target train 3 through its own positioning system and the position information obtained by the current trackside device exceeds the second threshold, and all the position deviations between the position information obtained by at least one trackside device 1 continuously passed through by the target train 3 and the position information obtained by the target train 3 through its own positioning system do not exceed the second threshold, it may be determined that the positioning module of the current trackside device 1 is abnormal. The target train 3 and/or the trackside device 1 may report the abnormal state to the ground center 5.

In other examples, when the positioning system of the target train 3 itself fails or is in an abnormal state, the current position of the target train 3 may be determined based on the position information obtained from the positioning the target train 3 by a corresponding trackside device 1.

In one possible implementation, the trackside device 1 further includes a clock synchronization module, which is configured to implement clock synchronization control of the target train 3. Optionally, the clock synchronization module may be integrated with the positioning module. For example, a GPS module 15 may provide both a positioning function and a clock synchronization function. In a specific implementation, some trackside devices 1 in the track star chain system are externally connected with a GPS antenna 18, the GPS module 15 of the trackside device 1 obtains a clock signal through the external connected GPS antenna 18 to provide clock synchronization services for other star chain nodes and the target train 3, which is conducive to ensuring exact operation of the target train 3.

In one possible implementation, the trackside device 1 also includes a maintenance module, which may be configured to receive firmware online upgrade information and upgrade the trackside device 1 according to the received information.

The maintenance module may also be configured to receive updated line information and update line information stored by the trackside device 1 according to the received information, so as to facilitate the maintenance and update of the trackside device 1.

In a specific implementation, the maintenance module may have an Over-the-Air Technology (OTA) online upgrade function, and may perform firmware online upgrade of the trackside device 1 and timely update the line information of trackside device 1 through the ground center 5, which greatly reduces the workload and time cost of device update and maintenance.

In one possible implementation, the trackside device 1 also includes a power source module 16, which is configured to electrically connect with a power supply module 17, so that the power supply module 17 can provide electric energy for the trackside device 1. The power supply module 17 includes at least one of a solar power supply module 17, a wind energy power supply module 17 and a vibration energy power supply module 17.

In this example, the power supply module 17 may adopt self-power supply technology. Specifically, clean energy such as solar energy, wind energy and vibration (track vibration) energy may be used to realize self-power supply, which is conducive to reducing the layout of cables. Furthermore, combined with wireless communication, trackside cables may be reduced or even completely removed, which is conducive to reducing the installation and maintenance costs.

The power source module 16 is configured to implement power supply control of the trackside device 1. The power supply control includes determining a power supply mode, for example, determining one of solar energy, wind energy, vibration energy and wired power supply mode to supply power to the trackside device 1. Optionally, the power supply module 17 and the power source module 16 may be arranged integrally, or the power supply module 17 and the power source module 16 may be arranged separately.

In a specific implementation, in order to ensure working reliability of the trackside device 1, the trackside device 1 may adopt a cooperative power supply of various power supply modes, which can be specifically set according to an application scenario of the trackside device 1. For example, for closed scenarios such as tunnels where solar and wind energy power supply methods cannot be applied, a wired power supply method and a vibration energy power supply method may be used for collaborative power supply temporarily. For example, when the electric energy provided by vibration energy is insufficient to meet a power demand, the wired power supply method can be used to obtain electric energy. For relatively open scenarios on the ground, solar energy, wind energy, vibration energy and wired power supply can be used for collaborative power supply. Specifically, solar energy, wind energy and vibration energy can be preferentially used for power supply. Priorities of solar energy, wind energy and vibration energy can be set according to actual needs. For example, it can be determined according to the electric energy stored in solar energy, wind energy and vibration energy, and a priority is given to that with more power.

The trackside device 1 provided in this embodiment undertakes a variety of service functions for the target train 3, personnel (including operation and maintenance personnel and passengers) and the ground center 5, can provide section clearance and occupancy detection, driving permission, positioning, and trackside resource control for the target train 3, can provide positioning and protection for the operation and maintenance personnel, and can provide Internet access services for passengers and provide video detection, line state detection, abnormality alarm push, state monitoring of the trackside device 1 and other functions for the ground center 5.

The trackside device 1 of this embodiment may adopt a completely wireless power supply and communication mode, may realize installation and deployment without cables, and thus may reduce complexity and costs of installation and deployment.

The trackside device 1 of this embodiment can form a cooperative system taking a vehicle track as a center with the target train 3 and the ground center 5, can meet communication requirements of vehicle to trackside and trackside to the ground center 5 through wireless multi-hop and ad hoc networking technologies, and can realize operation control of the target train 3 in a vehicle-track coordination mode by interlocking control of vehicle-track-trackside resources, intelligent sensing, image monitoring, trackside to vehicle and trackside to the ground center 5 communication.

As shown in FIGS. 1 to 4, the embodiments also provide a track star chain system, including: a plurality of trackside devices 1 in any one of the above examples, wherein the trackside devices 1 are configured to communicatively connected with the ground center 5 and the target train 3 and communication connections between the plurality of trackside devices 1 are established through the ad hoc networking technology and/or the multi-hop networking technology.

The structure, function and implementation process of the trackside device 1 are the same as the above examples, and this embodiment will not be repeated here.

Optionally, the track star chain system may also include the ground center 5 for managing respective trackside devices 1.

As shown in FIG. 5, the embodiments also provide a train operation control system, including the target train 3, the ground center 5 and at least one trackside device 1 in any one of the above examples, wherein the trackside device 1 is communicatively connected with the ground center 5 and the target train 3.

When there are multiple trackside devices 1, the multiple trackside devices 1 establish communication connections with each other through the ad hoc networking technology and/or the multi-hop networking technology.

The structure, function and implementation process of the trackside device 1 are the same as the above examples, and this embodiment will not be repeated here.

Although preferred embodiments of the application have been described, those skilled in the art may make additional changes and modifications to these embodiments once they know the basic inventive concept. Therefore, the appended claims are intended to be interpreted as including preferred embodiments and all changes and modifications falling within the scope of the application.

Obviously, those skilled in the art can make various changes and modifications to the application without departing from the spirit and scope of the application. In this way, if these modifications and variants of the application fall within the scope of the claims of the application and its equivalent technology, the application is also intended to include these modifications and variants.

What is claimed is:

1. A trackside device, characterized by comprising:
a sensor circuit configured to collect detection information at a side of a track;
a processing circuit configured to process the detection information to obtain a processing result, wherein the processing result comprises at least one of the following: a track section having been cleared, the track section having been occupied, an obstacle detection result and an obstacle recognition result;
a trackside resource control circuit configured to drive and control a trackside resource when a trackside resource request is received from a target train and the trackside resource is in a released state, wherein the trackside resource control circuit is further configured to monitor a state of the trackside resource; and
a communication circuit configured to communicatively connect with a ground center and the target train and send the processing result and/or the state of the trackside resource to the ground center and/or the target train, communicatively connect with another trackside device through ad hoc networking technology and/or multi-hop networking technology; and
a positioning circuit configured to position the target train and correct position information obtained by the target train through its own positioning system to obtain position information of the target train, wherein the positioning circuit is configured to: obtain a position deviation between position information obtained by the trackside device from positioning the target train and the position information obtained by the target train through its own positioning system; determine the position information obtained by the target train through its own positioning system as the position information of the target train when the position deviation does not exceed a first threshold; and determine an average value of the position information obtained by the trackside device from positioning the target train and the position information obtained by the target train through its own positioning system as the position information of the target train when the position deviation exceeds the first threshold but does not exceed a second threshold.

2. The trackside device according to claim 1, characterized in that the communication circuit is configured to communicatively connect with another trackside device through ad hoc networking technology or multi-hop networking technology.

3. The trackside device according to claim 1, characterized in that the communication circuit is configured to communicatively connect with at least part of other trackside devices of a track star chain system through multi-hop networking technology.

4. The trackside device according to claim 1, characterized in that the sensor circuit comprises at least one radar for detecting point cloud data of a target object, and the processing circuit is configured to determine at least one of shape information, size information, and distance information of the target object according to the point cloud data;
the sensor circuit further comprises at least one camera for detecting image data of the target object, and the processing circuit is configured to determine existence information of the target object according to the image data;
the detection information comprises the point cloud data and the image data of the target object.

5. The trackside device according to claim 4, characterized in that the communication circuit is configured to send the point cloud data and/or the image data to the ground center, so that the ground center can detect an environment at the side of the track according to received data.

6. The trackside device according to claim 1, characterized in that the trackside resource control circuit is further configured to determine whether the trackside resource is abnormal according to the state of the trackside resource, and generate abnormality prompt information when determining the trackside resource is abnormal; and
the communication circuit is configured to send the abnormality prompt information to the ground center.

7. The trackside device according to claim 1, characterized in that the communication circuit is further configured to connect with an Ethernet system of an adjacent station through an optical fiber link; and/or
the communication circuit is further configured to receive a network access request from a requesting device and establish a wireless connection with the requesting device according to the network access request, so as to provide Internet services for the requesting device.

8. The trackside device according to claim 1, characterized by further comprising a positioning circuit configured to position the target train to obtain position information of the target train.

9. The trackside device according to claim 1, characterized by further comprising a clock synchronization circuit configured to implement clock synchronization control of the target train.

10. The trackside device according to claim 1, characterized by further comprising a maintenance circuit configured to receive firmware online upgrade information and upgrade the trackside device according to the received information or configured to receive updated line information and update line information stored by the trackside device according to the received information.

11. The trackside device according to claim 1, characterized by further comprising a power source circuit configured to electrically connect with a power supply circuit, wherein the power supply circuit is configured to provide electric energy for the trackside device and comprises at least one of a solar power supply circuit, a wind energy power supply circuit and a vibration energy power supply circuit.

12. A track star chain system, characterized by comprising a plurality of trackside devices, wherein each of the plurality of trackside devices comprises:
- a sensor circuit configured to collect detection information at a side of a track;
- a processing circuit configured to process the detection information to obtain a processing result, wherein the processing result comprises at least one of the following: a track section having been cleared, the track section having been occupied, an obstacle detection result and an obstacle recognition result;
- a trackside resource control circuit configured to drive and control a trackside resource when a trackside resource request is received from a target train and the trackside resource is in a released state, wherein the trackside resource control circuit is further configured to monitor a state of the trackside resource; and
- a communication circuit configured to communicatively connect with a ground center and the target train and send the processing result and/or the state of the trackside resource to the ground center and/or the target train, communicatively connect with another trackside device through ad hoc networking technology and/or multi-hop networking technology; and
- a positioning circuit configured to position the target train and correct position information obtained by the target train through its own positioning system to obtain position information of the target train, wherein the positioning circuit is configured to: obtain a position deviation between position information obtained by the trackside device from positioning the target train and the position information obtained by the target train through its own positioning system; determine the position information obtained by the target train through its own positioning system as the position information of the target train when the position deviation does not exceed a first threshold; and determine an average value of the position information obtained by the trackside device from positioning the target train and the position information obtained by the target train through its own positioning system as the position information of the target train when the position deviation exceeds the first threshold but does not exceed a second threshold.

13. The track star chain system according to claim 12, characterized in that the communication circuit is configured to communicatively connect with another trackside device through ad hoc networking technology or multi-hop networking technology.

14. The track star chain system according to claim 12, characterized in that the communication circuit is configured to communicatively connect with at least part of other trackside devices of the track star chain system through multi-hop networking technology.

15. The track star chain system according to claim 12, characterized in that the sensor circuit comprises at least one radar for detecting point cloud data of a target object, and the processing circuit is configured to determine at least one of shape information, size information, and distance information of the target object according to the point cloud data; the sensor circuit further comprises at least one camera for detecting image data of the target object, and the processing circuit is configured to determine existence information of the target object according to the image data;
the detection information comprises the point cloud data and the image data of the target object.

16. A train operation control system, characterized by comprising:
- a target train;
- a ground center; and
- at least one trackside device, wherein the trackside device is communicatively connected with the ground center and the target train and comprises:
- a sensor circuit configured to collect detection information at a side of a track;
- a processing circuit configured to process the detection information to obtain a processing result, wherein the processing result comprises at least one of the following: a track section having been cleared, the track section having been occupied, an obstacle detection result and an obstacle recognition result;
- a trackside resource control circuit configured to drive and control a trackside resource when a trackside resource request is received from a target train and the trackside resource is in a released state, wherein the trackside resource control circuit is further configured to monitor a state of the trackside resource; and
- a communication circuit configured to communicatively connect with a ground center and the target train and send the processing result and/or the state of the trackside resource to the ground center and/or the target train, communicatively connect with another trackside device through ad hoc networking technology and/or multi-hop networking technology; and
- a positioning circuit configured to position the target train and correct position information obtained by the target train through its own positioning system to obtain position information of the target train, wherein the positioning circuit is configured to: obtain a position deviation between position information obtained by the trackside device from positioning the target train and the position information obtained by the target train through its own positioning system; determine the position information obtained by the target train through its own positioning system as the position information of the target train when the position deviation does not exceed a first threshold; and determine an average value of the position information obtained by the trackside device from positioning the target train and the position information obtained by the target train through its own positioning system as the position information of the target train when the position deviation exceeds the first threshold but does not exceed a second threshold.

17. The train operation control system according to claim 16, characterized in that the communication circuit is configured to communicatively connect with another trackside device through ad hoc networking technology or multi-hop networking technology.

18. The train operation control system according to claim 16, characterized in that the communication circuit is configured to communicatively connect with at least part of other trackside devices of a track star chain system through multi-hop networking technology.

19. The train operation control system according to claim 16, characterized in that the sensor circuit comprises at least one radar for detecting point cloud data of a target object, and the processing circuit is configured to determine at least one of shape information, size information, and distance information of the target object according to the point cloud data;

the sensor circuit further comprises at least one camera for detecting image data of the target object, and the processing circuit is configured to determine existence information of the target object according to the image data;

the detection information comprises the point cloud data and the image data of the target object.

20. The train operation control system according to claim 19, characterized in that the communication circuit is configured to send the point cloud data and/or the image data to the ground center, so that the ground center can detect an environment at the side of the track according to received data.

* * * * *